(12) United States Patent
Lee

(10) Patent No.: US 6,933,974 B2
(45) Date of Patent: Aug. 23, 2005

(54) CMOS IMAGE SENSOR OUTPUTTING SIGNAL DATA BEFORE RESET DATA AND METHOD FOR DRIVING THE SAME

(75) Inventor: Seo Kyu Lee, Cheongju (KR)

(73) Assignee: Pixelplus Co., Ltd., Kyunggi-do (KR)

( * ) Notice: Subject to any disclaimer, the term of this patent is extended or adjusted under 35 U.S.C. 154(b) by 745 days.

(21) Appl. No.: 09/870,943

(22) Filed: Jun. 1, 2001

(65) Prior Publication Data

US 2002/0001038 A1 Jan. 3, 2002

(51) Int. Cl.[7] .............................................. H04N 3/14
(52) U.S. Cl. ...................................... 348/308; 348/302
(58) Field of Search ................................. 348/297, 302, 348/303, 304, 308

(56) References Cited

U.S. PATENT DOCUMENTS

| | | | | |
|---|---|---|---|---|
| 6,201,572 B1 | * | 3/2001 | Chou ........................... 348/241 |
| 6,248,991 B1 | * | 6/2001 | Chen et al. ............... 250/208.1 |
| 6,388,241 B1 | * | 5/2002 | Ang ........................... 250/208.1 |
| 6,441,852 B1 | * | 8/2002 | Levine et al. ................ 348/302 |
| 6,532,040 B1 | * | 3/2003 | Kozlowski et al. .......... 348/241 |
| 6,665,013 B1 | * | 12/2003 | Fossum et al. .............. 348/308 |
| 6,710,804 B1 | * | 3/2004 | Guidash ...................... 348/302 |
| 6,727,946 B1 | * | 4/2004 | Zhao et al. .................. 348/308 |
| 6,753,912 B1 | * | 6/2004 | Wayne ........................ 348/241 |

* cited by examiner

*Primary Examiner*—Wendy R. Garber
*Assistant Examiner*—Jacqueline Wilson
(74) *Attorney, Agent, or Firm*—Rabin & Berdo, P.C.

(57) ABSTRACT

A CMOS image sensor that outputs signal data before outputs reset data, and a driving method therefor. The CMOS image sensor includes a pixel sensor, a data I/O line, a double sampling circuit and an output circuit. The pixel sensor generates signal data and reset data. The signal data has a voltage level depending on an amount of photo-charge produced in response to energy received externally. The reset data is produced in a reset mode. The data I/O line transfers the generated signal data and the reset data. The double sampling circuit samples the signal data and then the reset data, from the data I/O line, and drives an output terminal. The output circuit outputs data related to a voltage level of the output terminal.

9 Claims, 3 Drawing Sheets

CMOS IMAGE SENSOR OUTPUTTING SIGNAL DATA BEFORE RESET DATA AND METHOD FOR DRIVING THE SAME

BACKGROUND OF THE INVENTION

1. Field of the Invention

The invention relates to an image sensor, and more particularly, to an image sensor with complementary metal oxide semiconductor (CMOS) pixel, and a method for driving the same

2. Description of the Related Art

An image sensor captures images by using an energy response characteristic of a semiconductor material, to detect the energy (for example, light). The image sensor can be classified generally as either a CMOS image sensor and a charge coupled device (CCD) image sensor. The CMOS image sensor can be operated by a single power voltage source. So, the CMOS image sensor has the advantages of lower power consumption and smaller size, as compared with the CCD image sensor. Therefore, the CMOS image sensor is generally used.

FIG. 1 illustrates a conventional image sensor. The conventional CMOS image sensor has a pixel sensor 101 and a double sampling circuit 103. According to the conventional image sensor, when a reset signal RS goes to a logic HIGH, a reset transistor 101a is turned on and the voltage at a node N101 rises. Then, via a driving transistor 101c and a selecting transistor 101d, reset data, having a voltage of nearly VDD, is transferred to a data input-output (I/O) line DIO And then, when the reset signal RS goes to a logic LOW and a control signal TX goes to a logic HIGH, the reset transistor 101a is turned off and a transfer transistor 101b is turned on. Via the driving transistor 101c and the selecting transistor 101d, signal data in a photo-diode 101e is transferred to the data I/O line DIO. Then, the reset data and the signal data transferred to the data I/O line DIO are sampled by a double sampling circuit 103 connected to the data I/O line DIO.

In the conventional image sensor, the signal data is sampled and outputted after the reset data is sampled and outputted. Therefore, the signal data is mostly maintained in the data I/O line DIO According to the conventional CMOS image sensor, the double sampling circuit 103 includes a sampling transistor 103a, an assistance capacitor 103b, a coupling capacitor 103c and a pre-charging transistor 103d. The sampling transistor 103a cuts the sampled signal data off from the data I/O line DIO, whereby an output signal VOUT having a stable voltage level can be generated via an output terminal DQ The assistance capacitor 103b prevents a node N103 from floating. If the assistance capacitor 103b is not implemented, the node N103 can be floated when the sampling transistor 103a is turned off. A capacitance, of a virtual capacitor created by the assistance capacitor 103b and the coupling capacitor 103c, is nearly equivalent to that of an output capacitor 105a in an output circuit 105. The pre-charging transistor 103d pre-charges a side terminal of the coupling capacitor 103c with a reference voltage VR, which is lower than (VDD−Vth).

However, the conventional CMOS image sensor has a problem that a very large layout area is required. That is, the conventional CMOS image sensor requires that the layout area be capable of mounting the sampling transistor 103a, the assistance capacitor 103b, and a reference voltage generating circuit (not shown) for generating the reference voltage VR.

SUMMARY OF THE INVENTION

To solve the above problem, it is one object of the invention is to provide a CMOS image sensor capable of reducing a layout area.

Another object of the invention is to provide a method for driving the CMOS image sensor.

Accordingly, to achieve the one object, there is provided a CMOS image sensor that outputs signal data before reset data. The CMOS image sensor includes a pixel sensor, a data I/O line, a double sampling circuit and an output circuit. The pixel sensor generates the signal data and the reset data. The signal data has a voltage level depending on an amount of photo-charge produced in response to externally received energy. The reset data is produced in a reset mode. The data I/O line transfers the signal data and the reset data generated in the pixel sensor. The double sampling circuit samples the signal data and the reset data transferred from the data I/O line and drives an output terminal In this case, the double sampling circuit samples the signal data before the reset data. The output circuit outputs data related to the voltage level of the output terminal.

To achieve the other object, a method for driving a CMOS image sensor is provided. The CMOS image sensor has a plurality of pixel sensors arranged in rows and columns, generates reset data produced during a reset mode, and generates signal data depending on an amount of photo-charge produced in response to energy received from an external energy source. The method includes the steps of (a) generating a read signal and activating a row-selecting signal for selecting the row, (b) activating a data output signal, (c) outputting the signal data in response to the data output signal, (d) driving the reset mode after the step (c), and (e) outputting the reset data.

BRIEF DESCRIPTION OF THE DRAWINGS

The foregoing and further objects, features and advantages of the invention will become more apparent from a consideration of the following description and the accompanying drawings, in which the same numerals indicate the same or corresponding parts.

DESCRIPTION OF THE PREFERRED EMBODIMENT

Figure 2:
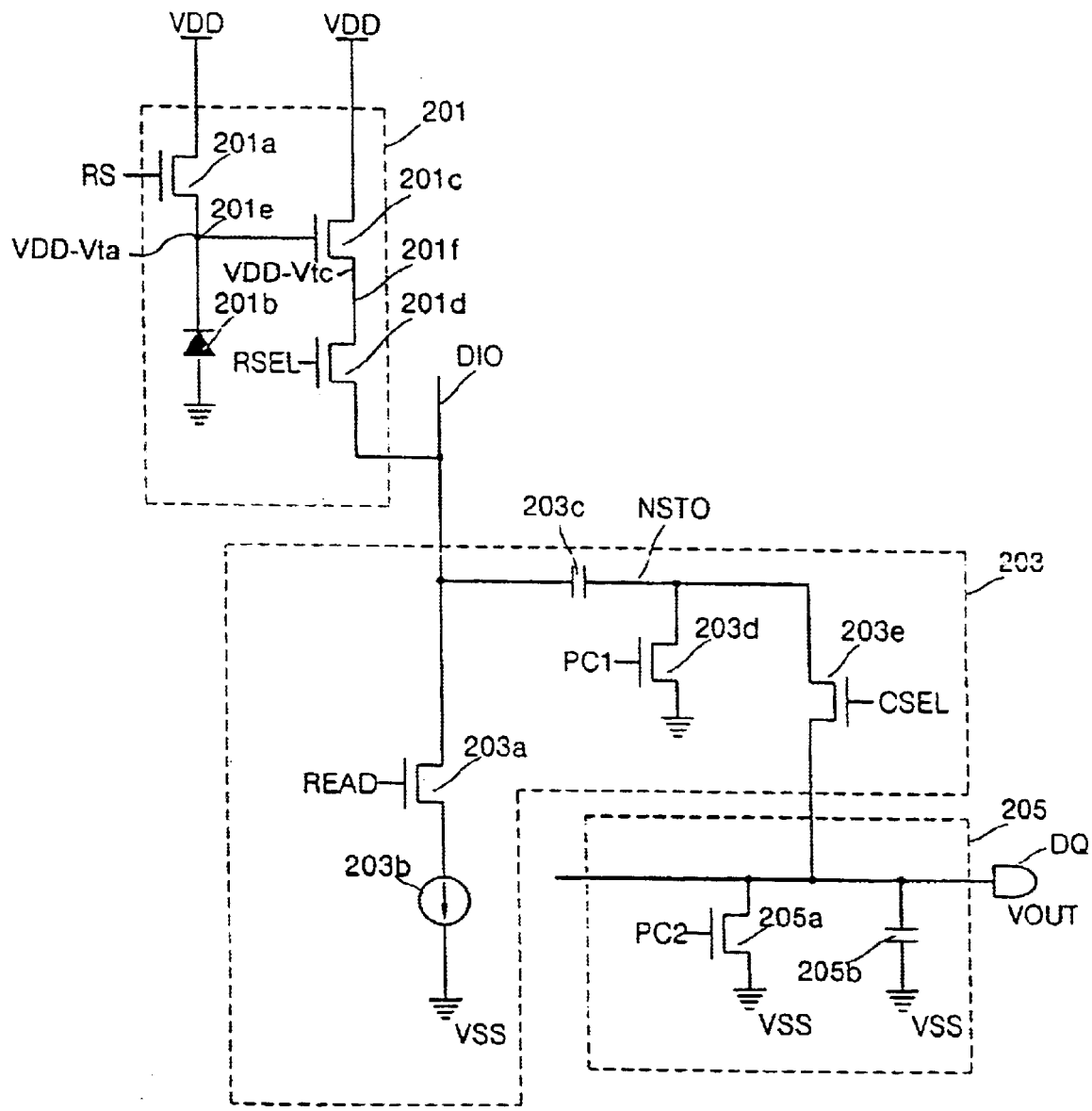
FIG. 2 is a circuit diagram representing a CMOS image sensor according to a preferred embodiment of the invention.

FIG. 2 is a circuit diagram representing a CMOS image sensor according to a preferred embodiment of the invention. Referring to FIG. 2, the CMOS image sensor includes a pixel sensor 201, a data I/O line DIO, a double sampling circuit 203 and an output circuit 205.

The pixel sensor 201 includes a reset transistor 201a, a photo-diode 201b, a driving transistor 201c, a selecting transistor 201d and a common junction node 201e. The photo-diode 201b produces photo-charge in response to externally supplied energy (for example, electromagnetic energy such as light) and generates signal data depending on the amount of photo-charge produced. The reset transistor 201a is gated in response to a reset signal RS and drives a voltage level of the common junction node 201e to a voltage level (VDD−Vta) Here, the VDD and the Vta represent an external power voltage and a threshold voltage, respectively. A source and a drain of the reset transistor 201a are connected to the external power voltage VDD and the common junction node 201e, respectively Preferably, the reset transistor 201a is an N-channel metal oxide semiconductor (NMOS) transistor.

The driving transistor 201c is an NMOS transistor having a gate and a drain connected to the common junction node 201e and the external power voltage VDD, respectively So, a voltage level of a source node 201f of the driving transistor 201c decreases that of the common junction node 201e by a voltage Vtc. Here, Vtc is a threshold voltage of the driving transistor 201c.

The voltage level of the source node 201f is transferred to the data I/O line DIO by the selecting transistor 201d. The selecting transistor 201d is gated in response to a row-selecting signal RSEL. The row-selecting signal RSEL selects a row of a pixel array (not shown). That is, the signal and the reset data of the pixel sensor 201, which is arranged in the row selected due to the row-selecting signal RSEL, are transferred to the data I/O line DIO for every column Then, the signal data of the pixel sensor 201 is transferred to the double sampling circuit 203 to be sampled therefrom. In the preferred embodiment, the selecting transistor 201d is an NMOS transistor. Thereafter, the reset data of the pixel sensor 201 is transferred to, and sampled by the double sampling circuit 203 That is, according to the invention, the signal data is sampled before the reset data.

The double sampling circuit 203 includes a first transistor 203a, a current source 203b, a coupling capacitor 203c, a second transistor 203d and a third transistor 203e. When a read command is generated, the first transistor 203a is turned on in response to a read command signal READ. The data I/O line DIO is driven to a first reference voltage (for example, a ground voltage VSS). With the read command, the CMOS image sensor is controlled to output a value related to the signal data stored in the pixel sensor 201. The coupling capacitor 203c is formed between the data I/O line DIO and a storing node NSTO, to couple the storing node NSTO with the data I/O line DIO In this embodiment, a terminal of the coupling capacitor 203c is directly connected to the data I/O line DIO. Therefore, for the invention, it is not required to implement either of the sampling transistor 103a and the assistance capacitor 103b of the conventional CMOS image sensor The second transistor 203d is gated in response to a first control signal PC1, and drives the storing node NSTO to a second reference voltage (for example, the ground voltage VSS). The first control signal PC1 is generated in the form of a pulse, when the read command is inputted. The third transistor 203e is gated in response to a column-selecting signal CSEL, and transfers the voltage of the storing node NSTO to an output terminal DQ. An output signal VOUT is outputted via the output terminal DQ. The column-selecting signal CSEL selects a column of the pixel array. That is, the output signal and the reset data, which are stored in the column selected by the column-selecting signal CSEL, are transferred to the output terminal DQ.

To the output terminal DQ, as many column-selecting transistors as columns of the pixel sensor, are connected. Therefore, a capacitance produced due to the column-selecting transistor 203e connected to the output terminal DQ can be modeled by means of a storing capacitor 205b.

A fourth transistor 205a is gated in response to a second control signal PC2, and drives the output terminal DQ to the ground voltage VSS. Before the column-selecting signal CSEL is activated, the second control signal PC2 is activated to pre-charge the output terminal DQ.

When the column-selecting signal CSEL goes to logic HIGH, charge stored in the storing node NSTO is distributed to the coupling capacitor 203c and the storing capacitor 205b in a ratio equal to the capacitance ratio of the coupling capacitor 203c to the storing capacitor 205b. Then, the voltage at the storing node NSTO becomes a voltage of the output terminal DQ.

Figure 3:
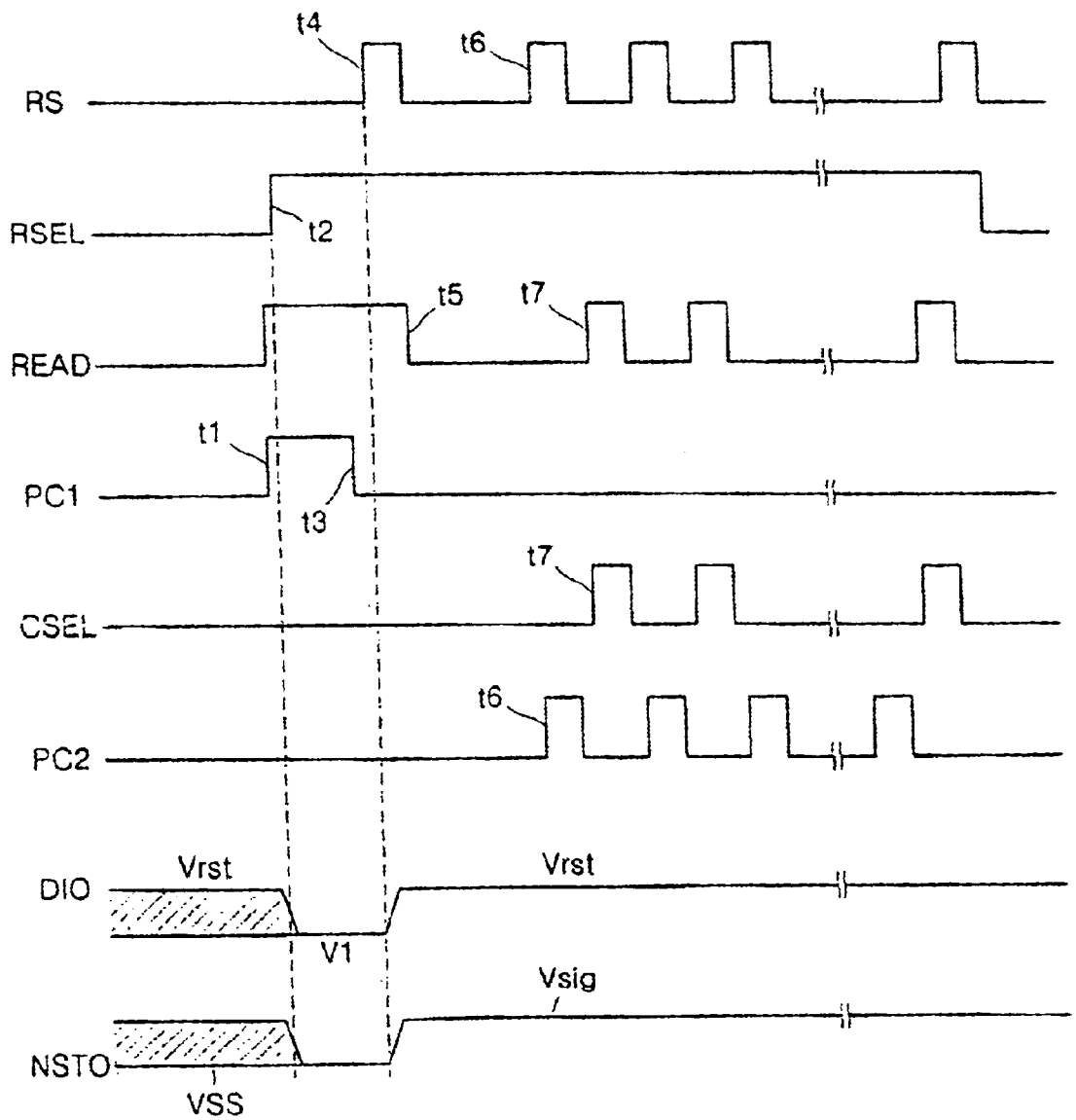
FIG. 3 is a timing diagram for explaining the main signals and node voltages provided or generated when the CMOS image sensor is driven according to the invention.

FIG. 3 is a timing diagram for explaining main signals and nodes involved in driving the CMOS image sensor according to the invention.

Firstly, when the first control signal PC1 is at a logic HIGH at a time t1, the storing node NSTO is pre-charged with the ground voltage VSS. The photo-diode 201b, which has been reset prior to the time t1, is in a state of accumulating photo-charge.

Thereafter, when the row-selecting signal RSEL and the read command signal READ are at a logic HIGH at a time t2, a source follower circuit consisting of the first transistor 203a, a driving transistor 201c and the selecting transistor 201d can be driven. Then, a voltage difference V1, between a photo signal voltage level Vsig and a voltage level Vrst of the reset data, is supplied to the data I/O line DIO. In this case, since the second transistor 203d is turned on, the storing node NSTO is maintained at the ground voltage VSS. Therefore, the voltage difference V1 is stored between the two sides of the coupling capacitor 203c.

When the first control signal PC1 is at a logic LOW at a time t3, the storing node NSTO is in a floating state. Thereafter, when the reset signal RS goes to logic HIGH at a time t4, the data I/O line DIO is driven to the reset data voltage Vrst. Then, a voltage level of the storing node NSTO is driven up to the photo signal level Vsig (wherein, Vsig=Vrst−V1=Vrst−Vrst+Vsig) by the coupling capacitor 203c.

When the read command signal READ is at a logic LOW at a time t5, the current source 203b is cut off. In this state, data of all the columns related to a single row are stored in the storing node NSTO. Then, data of the columns are serially read out.

In this case, the read process for the data of each column is described in detail as follows. If the second control signal PC2 goes to logic HIGH at a time t6, the output terminal DQ is pre-charged with the ground voltage VSS. Thereafter, the second control signal PC2 again goes to logic LOW. Then, if the column-selecting signal CSEL for selecting a column, and the read command signal READ, are generated in the form of a pulse at a time t7, the data stored in each column is read out.

According to the method for driving the CMOS image sensor, the reset data is outputted after the signal data. So, the data I/O line DIO and the output terminal DQ are maintained with the voltage level of the reset data Therefore, the CMOS image sensor and the method of driving the same according to the invention have advantages as follows.

Figure 1:
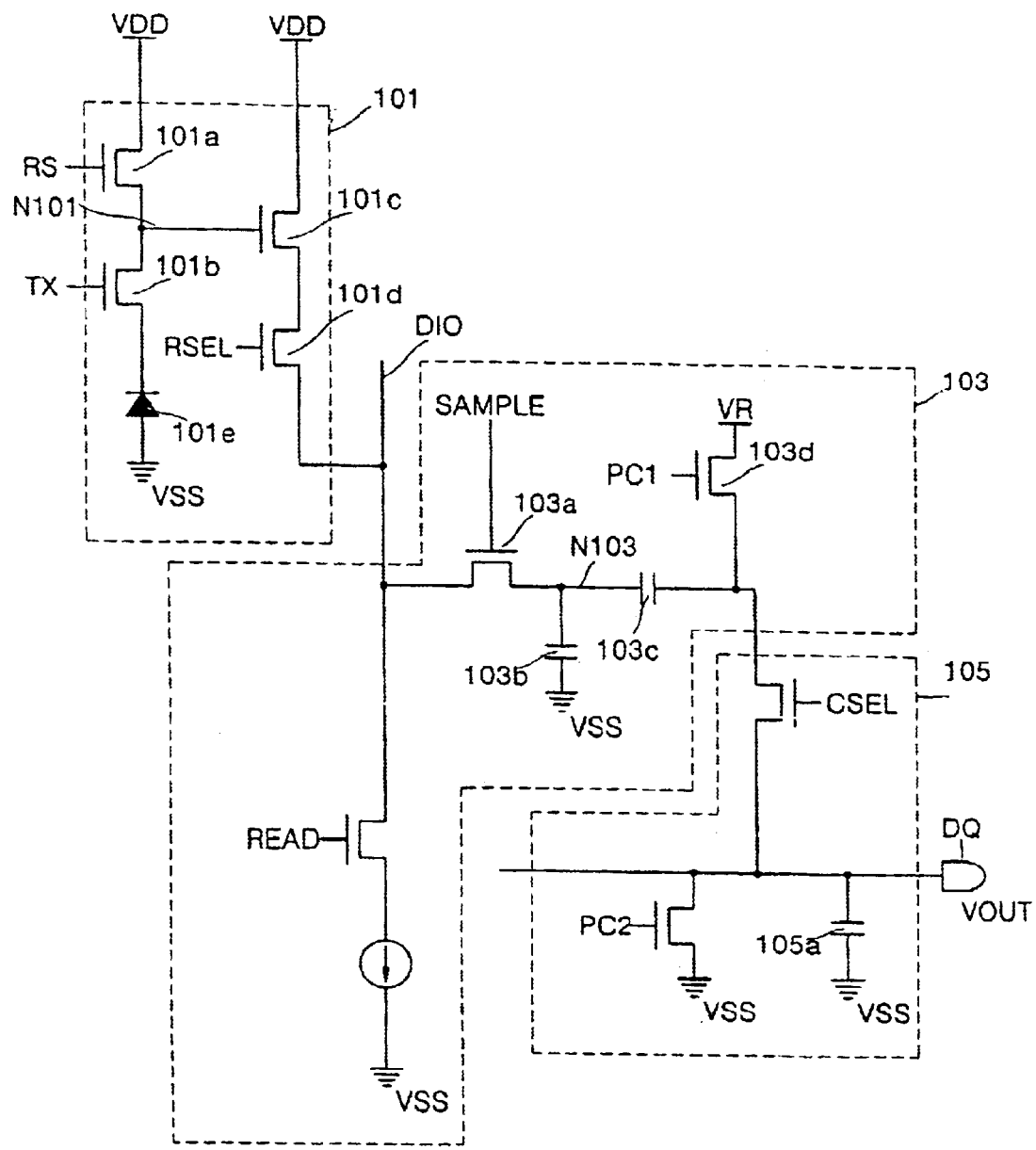
FIG. 1 illustrates a conventional CMOS image sensor.

1) The sampling transistor 103a of the conventional art (FIG. 1) is not required.

2) The invention does not require the assistance capacitor 103b of the conventional art. Further, the capacitance of the coupling capacitor 203c is decreased to about ¼ that of the conventional coupling capacitor 103c.

3) Since the reference voltage VR of the conventional art is not required, the invention does not require a circuit for generating the reference voltage.

As described above, since the CMOS image sensor according to the invention outputs the signal data before the reset data, the number of elements for maintaining the voltage level of the signal data is decreased. Therefore, the invention can remarkably reduce the layout area, as compared with the conventional CMOS image sensor.

While this invention has been particularly shown and described with reference to the preferred embodiments thereof, it will be understood by those skilled in the art that various changes and equivalents may be made without departing from the spirit and scope of the invention. For example, in the above-mentioned embodiment, sources of the second transistor 203d and the fourth transistor 205d are connected to the ground voltage VSS. But, according to another embodiment, the sources of the second transistor 203d and the fourth transistor 205d can be connected to a voltage line of a predetermined voltage (e g., ½ of the power voltage VDD) different from the ground voltage VSS. Therefore, the scope of the invention should be determined with reference only to the appended claims.

What is claimed is:

1. A CMOS image sensor, comprising:
   a pixel sensor having a reset mode, the pixel sensor generating reset data in the reset mode, the pixel sensor further generating signal data, the pixel sensor being responsive to energy received externally, for generating the signal data, the pixel sensor producing an amount of photo-charge according to the amount of the received energy and converting the produced photo-charge to the signal data, the signal data having a voltage level depending on the amount of the produced photo-charge;
   a data I/O line carrying the signal data and the reset data generated in the pixel sensor;
   a double sampling circuit coupled to the data I/O line for sampling the signal data and the reset data, and driving an output terminal, wherein the double sampling circuit samples the signal data before sampling the reset data; and
   an output circuit for outputting data related to a voltage level of the output terminal, wherein the double sampling circuit comprises:
      a first transistor driving the data I/O line to a first reference voltage in response to a read command, and outputting a value related to the signal data;
      a coupling capacitor coupling a storing node with the data I/O line;
      a second transistor driving the storing node to a second reference voltage in response to a control signal; and
      a third transistor transferring a voltage of the storing node to the output terminal in response to a second selecting signal.

2. The CMOS image sensor in accordance with claim 1, wherein the pixel sensor comprises:
   a common junction node;
   a reset transistor having a source connected to the common junction node and a drain receiving an externally supplied power voltage, the reset transistor being gated in response to a reset signal;
   a photo-diode generating the signal data;
   a driving transistor having a gate connected to the common junction node and a drain receiving the external power voltage; and
   a selecting transistor transferring a source voltage of the driving transistor to the data I/O line in response to a first selecting signal.

3. The CMOS image sensor in accordance with claim 2, wherein the reset transistor, the driving transistor and the selecting transistor are each N-channel metal oxide semiconductor (NMOS) transistors.

4. The CMOS image sensor in accordance with claim 2, wherein the first selecting signal is a row-selecting signal for selecting a row of a pixel array.

5. The CMOS image sensor in accordance with claim 1, wherein the first reference voltage is a ground voltage (VSS).

6. The CMOS image sensor in accordance with claim 1, wherein the second reference voltage is a ground voltage (VSS).

7. The CMOS image sensor in accordance with claim 1, wherein the first transistor and the second transistor are each N-channel metal oxide semiconductor (NMOS) transistors.

8. The CMOS image sensor in accordance with claim 1, wherein the second selecting signal is a column-selecting signal for selecting a column of a pixel array.

9. The CMOS image sensor in accordance with claim 1, wherein the coupling capacitor has a terminal connected to the data I/O line.

* * * * *